(12) United States Patent
Laney et al.

(10) Patent No.: US 7,273,640 B2
(45) Date of Patent: *Sep. 25, 2007

(54) HIGHLY REFLECTIVE OPTICAL ELEMENT

(75) Inventors: Thomas M. Laney, Spencerport, NY (US); Kenneth W. Best, Jr., Hilton, NY (US); Robert P. Bourdelais, Pittsford, NY (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 24 days.

This patent is subject to a terminal disclaimer.

(21) Appl. No.: 10/954,003

(22) Filed: Sep. 29, 2004

(65) Prior Publication Data

US 2005/0112296 A1    May 26, 2005

Related U.S. Application Data

(63) Continuation-in-part of application No. 10/718,902, filed on Nov. 21, 2003, now abandoned.

(51) Int. Cl.
    *G02B 17/00* (2006.01)
(52) U.S. Cl. ............ 428/1.1; 428/480; 428/315.5; 428/315.9; 349/67; 349/113; 359/361
(58) Field of Classification Search ............ 428/1.1, 428/480, 315.5, 315.9; 346/67, 95, 113, 346/166; 359/361
See application file for complete search history.

(56) References Cited

U.S. PATENT DOCUMENTS

| | | | |
|---|---|---|---|
| 4,705,813 A * | 11/1987 | Ito et al. .................. 521/92 |
| 5,178,943 A * | 1/1993 | Asai et al. ................. 428/330 |
| 5,340,646 A | 8/1994 | Morita et al. |
| 5,422,175 A * | 6/1995 | Ito et al. .................. 428/304.4 |
| 5,672,409 A | 9/1997 | Miyakawa et al. |
| 5,710,856 A | 1/1998 | Ishii et al. |
| 5,731,071 A * | 3/1998 | Etchu et al. ............... 428/220 |
| 5,833,878 A * | 11/1998 | Shinohara .............. 252/299.01 |
| 5,843,578 A * | 12/1998 | Sasaki et al. ............. 428/483 |
| 5,993,958 A * | 11/1999 | Okutsu .................. 428/338 |
| 6,266,113 B1 * | 7/2001 | Yamazaki et al. ......... 349/115 |
| 7,029,819 B2 * | 4/2006 | Laney et al. ............. 430/139 |
| 2002/0098341 A1 | 7/2002 | Schiffer et al. |

FOREIGN PATENT DOCUMENTS

EP    1302788    4/2003
JP    3355204    11/1994

OTHER PUBLICATIONS

English Translation of JP 06-067174, Yasunori, Nov. 1994.*
T. M. Laney, "Phosphor Screen and Imaging Assembly with Poly(Lactic Acid) Support", U.S. Appl. No. 10/719,728, (D-86863) filed Nov. 21, 2003.
T. M. Laney, "Highly Reflective Optical Element", U.S. Appl. No. 10/719,762, (D-87340) filed Nov. 21, 2003.

* cited by examiner

*Primary Examiner*—Terrel Morris
*Assistant Examiner*—Sow-Fun Hon
(74) *Attorney, Agent, or Firm*—Edwin Oh

(57) ABSTRACT

A reflective optical film comprises a layer containing a polyester voided with inorganic particles such as barium sulfate in a size and an amount sufficient to provide a visible light reflectivity of at least 93%, a void volume of 40 to 70%, the film at least (1) having a thickness of less than 150 μm, or (2) containing UV particles in amounts sufficient to provide a UV light reflectivity of less than 40%.

21 Claims, No Drawings

HIGHLY REFLECTIVE OPTICAL ELEMENT

CROSS-REFERENCE TO RELATED APPLICATION

This application is a continuation-in-part of U.S. Ser. No. 10/718,902 filed Nov. 21, 2003 now abandoned which was co-filed with commonly assigned applications entitled "HIGHLY REFLECTIVE OPTICAL ELEMENT", Ser. No. 10/719,762, filed Nov. 21, 2003 now abandoned and "PHOSPHOR SCREEN AND IMAGING ASSEMBLY WITH POLY(LACTIC ACID) SUPPORT", Ser. No. 10/719,728, filed Nov. 21, 2003 now U.S. Pat. No. 6,846,606.

FIELD OF THE INVENTION

The invention relates to a highly reflective optical film comprising a layer containing a polyester voided with inorganic particles such as barium sulfate. The film is sufficiently voided to provide diffuse reflectance of at least 93% even at a thickness less than 150 μm and can exhibit reduced reflection of UV light below 40% by additional presence of UV absorbing particles. In a preferred form, the invention relates to a liquid crystal display device employing such a reflector film.

BACKGROUND OF THE INVENTION

A side light system, such as system disclosed in JP-A-SHO 63-62104, has been broadly applied as a means to illuminate a liquid crystal display. The advantages of a side light system is that it can be made thin and can illuminate the display or board uniformly. In the side light system, halftone dots are printed on one surface of a transparent substrate having a certain thickness such as an acrylic plate, and a light from a light source such as a cold cathode ray tube is applied to the substrate through the edge of the substrate. The applied light is uniformly dispersed by the halftone dot print, and a uniform brightness can be obtained across the surface of a display. In other systems, the light source is provided directly in back of the display.

In either such light system, a reflective optical element or reflector must be provided on the back surface of the transparent light guiding plate in order to prevent light from escaping through the back surface. This reflector must be thin and must have a high reflectance property. Although a metal deposited layer such as one disclosed in JP-A-SHO 62-169105 or a white synthetic paper such as one disclosed in JP-A-SHO 63-62104 has been used as the reflector, the deposited layer is expensive and the synthetic paper cannot produce a sufficient reflectance. Accordingly, in practice, a white polyester film in which a white pigment such as titanium oxide is added, such as one disclosed in JP-A-HEI 2-269382, has been used as the reflector. However, although the reflectance of the reflector can be increased to some extent by using such a white polyester film whitened by adding a pigment such as titanium oxide, the increase of the reflectance is limited to an insufficient level. Recently voided polyester films have been used, such as the ones disclosed in U.S. Pat. No. 5,672,409, as the reflector. The voided film described offers high reflectance in a broader range of wavelengths.

Although the reflectance of the reflector described in U.S. Pat. No. 5,672,409 was high (greater than 94%) it was achieved at a thickness greater than 150 μm. A survey of the most widely used commercial films for reflectors indicated that none had reflectance above 93% with a thickness less than 150 μm (see Table 1). It is desirable to make the reflector element as thin as possible in a display so as to minimize the entire display thickness. This is especially true in displays used in cell phones or PDA's (personal digital assistant) where the reflector display is desirable at under 150 μm thickness but maintain high reflectance, greater than 93%.

The reflector described in U.S. Pat. No. 5,672,409 has high average reflectance from 330-380 nm. Although this is claimed as an advantage, in practice the elimination of light from 200 to 400 nm is desirable as this light can be damaging to the liquid crystal polymer in the display. This will become more of a problem as the other optical elements in the display are simplified, a trend in the industry. Much of the harmful UV light, 200 to 400 nm, is currently absorbed by the other optical elements in current displays but will likely not be the case in future more simplified screen designs, especially for larger television displays Therefore, an optical element or reflector is required that can achieve high reflectivity, greater than 93% in the visible wavelengths at a range of thicknesses, especially below 150 μm. It is further required that reflectors be able to minimize reflectance at wavelengths from 200 to 400 nm.

SUMMARY OF THE INVENTION

The invention provides a reflective optical film comprising a layer containing a polyester voided with inorganic particles such as barium sulfate in a size and an amount sufficient to provide a visible light reflectivity of at least 93% and a void volume from 40% to 70%, the film at least (1) having a thickness of less than 150 μm, or (2) containing UV particles in amounts sufficient to provide a UV light reflectivity of less than 40%. Also provided is a display such as an LCD display employing the film as a back light reflector.

The film and displays provide improved visible light reflection while providing low reflectance of UV light

DETAILED DESCRIPTION OF THE INVENTION

The invention is generally described above. The present invention will now be explained in more detail by embodiments and examples, however, the present invention is not restricted by the embodiments and examples.

The invention provides a reflective optical film, usable in a surface light source, which has a high reflectance, at least 93% in the visible wavelengths, 400 to 700 nm, at thicknesses below 150 μm. Additionally, the present invention can provide low UV reflectance at wavelengths from 200 to 400 nm, at levels even below 40%.

A reflector used in a surface light source according to the present invention comprises a white polyester film in which fine voids containing inorganic particles such as barium sulfate particles of a type and in an amount that provide visible reflectance above 93% (desirably at least 94 or 95 wt %) and provide at least (1) film thicknesses below 150 μm or (2) contain UV absorptive particles in an amount sufficient to achieve UV reflectance from 200 to 400 nm of 40% or less.

After stretching the inorganic loaded polyester layer the resulting voided layer has a very high level of void volume fraction. It is this high level of voiding that results in such high reflectivity. High void volumes coupled with small void sizes results in a maximum number of air to polymer interfaces as light travels from void to void in the layer. Light reflects due to changes in the index of refraction at these interfaces resulting in high layer reflectivity. The void volume fraction is defined as the ratio of voided thickness minus un-voided thickness to the voided thickness. This can be multiplied by 100 and represented as a percent void volume. The actual thickness, if an extruded monolayer, can be easily measured by any film thickness measuring device. If the layer is a co-extruded layer (extruded and stretched along with other layers), photo-microscopy of a cross-section can be used to determine the actual layer thickness. The un-voided thickness is defined as the thickness that would be expected had no voiding occurred, for example, the cast thickness divided by the stretch ratio in the machine direction and the stretch ratio in the cross direction. Voided layers of the invention have a void volume that can range from 40% to 70%. Improved reflectivity performance occurs with void volumes in the range of 50 to 70% and optimal reflectivity performance occurs between 60 and 70%.

In one embodiment or the reflective optical film of the invention, fine voids are formed in the polyester film by loading barium sulfate in a voided layer at levels between 40 and 70 wt %. If desired, UV reflectance is reduced to below 40% by loading UV absorbing particles in the voided layer, typically at 0.5 to 10 wt %.

The white polyester film used as the reflective optical film according to the present invention must contain fine voids that are initiated by inorganic particles of sufficiently small size and concentration. The shape of the void is not particularly restricted, and the shape is typically an elongated sphere or ellipsoid or a flattened sphere. The size of the preferred barium sulfate particles which initiate the voids upon stretching should have an average particle size of 0.1 to 10.0, usually 0.3 to 2.0, and desirably 0.5 to 1.5 μm. As used herein, "average particle size" is that as measured by a Sedigraph 5100 Particle Size Analysis System (by PsS, Limited).

In one embodiment of the present invention an additive UV light absorbing particle may be used to decrease the reflectance by the film of light in the 200 to 400 nm wavelength range. Such an additive is typically present in an amount of up to 10.0 wt % and suitably between 0.5 and 10.0 wt %. Titanium dioxide is one such UV light-absorbing particle that is preferred.

The white polyester film according to the present invention must have at least one layer containing the preferred barium sulfate particles present at a concentration in the range of 40.0 to 70.0 wt %, suitably 50-65 wt %, and desirably 55-65 wt %. If the concentration of barium sulfate particles is below 40.0 wt %, visible light reflection of at least 93% cannot be attained when the film thickness is less than 150 μm. If the concentration of barium sulfate is above the maximum, the amount of the fine voids is too great, and film breakage occurs in the film formation process. It is, of course, desirable to achieve even higher levels of reflectivity such as 96% or more, especially for thin films of less than 150 μm.

The thickness of a surface light source for an LCD display can be made sufficiently thin by using the white polyester film. Moreover, the white polyester film can be produced at a relatively low cost. Furthermore, since the polyester film has a high heat resistance, a high safety can be ensured even if the film is exposed to a light source having a relatively high temperature.

In the present invention, "polyester" means a polymer obtained by the condensation polymerization, at least in part, of a diol and a dicarboxylic acid. As the dicarboxylic acid, terephthalic acid, isophthalic acid, phthalic acid, naphthalenedicarboxylic acid, adipic acid, or sebacic acid can be used. As the diol, ethylene glycol, trimethylene glycol, tetramethylene glycol, or cyclohexanedimethanol can be used. More concretely, for example, polytetramethylene terephthalate, polyethylene-p-oxybenzoate, poly-1,4-cyclohexanedimethylene terephthalate, or polyethylene-2,6-naphthalenedicarboxylate can be used. Of course, these polyesters may be either homopolymer or copolymer. As a component to be copolymerized, a diol component such as diethylene glycol, neopentyl glycol or polyalkylene glycol and a dicarboxylic acid such as adipic acid, sebacic acid, phthalic acid, isophthalic acid or 2,6-naphthalenedicarboxylic acid can be used. In the present invention, poly-1,4-cyclohexanedimethylene terephthalate is preferable from the viewpoint of water resistance, chemical resistance and processing durability. The amorphous nature of this polymer results in a less brittle pre-stretched cast sheet allowing for the high levels of barium sulfate concentration without cracks forming prior to stretching. To the polyester, various kinds of known additives, for example, an oxidation inhibitor, or an antistatic agent may be added by a volume which does not destroy the advantages according to the present invention.

In the present invention, the polyester film is whitened by forming fine voids in the film and the resulting diffusion of light by the voids. The use of the barium sulfate present at concentrations greater than 40 wt % to initiate the voids results in a high reflectance (at least 93%), which has not been obtained in previously disclosed films at thicknesses less than 150 μm.

In one embodiment of the present invention a second voided polyester layer is adjacent to said barium sulfate voided layer. The two layers may be integrally formed using a co-extrusion or extrusion coating process. The polyester of the second voided layer can be any of the polyesters described previously for the barium sulfate voided layer. Suitably the polyester is polyethylene (terephthalate). The voids of this second voided layer are formed by finely dispersing a polymer incompatible with the matrix polyester material and stretching the film uniaxially or biaxially. When the film is stretched, a void is formed around each particle of the incompatible polymer. Since the formed fine voids operate to diffuse a light, the film is whitened and a higher reflectance can be obtained. The incompatible polymer is a polymer that does not dissolve into the polyester. Examples of such an incompatible polymer include poly-3-methylbutene-1, poly-4-methylpentene-1, polypropylene, polyvinyl-t-butane, 1,4-transpoly-2,3-dimethylbutadiene, polyvinylcyclohexane, polystyrene, polyfluorostyrene, cellulose acetate, cellulose propionate and polychlorotrifluoroethylene. Among these polymers, polyolefins such as polypropylene are suitable.

The content of the incompatible polymer in the second layer is desirably in the range of 5 to 30 wt %. If the content is lower than the above range, the desired reflectance cannot be obtained. If the content is higher than the above range, the strength of the film becomes too low for processing.

In another embodiment of the invention, a third voided layer meeting the same requirements as the barium sulfate voided first layer is provided adjacent to the second voided layer and on the opposite side from the first barium sulfate voided layer.

Moreover, in another embodiment of the present invention, the mean reflectance of the white polyester film in the range of wave length of a light of 200 to 400 nm is preferably less than 40%. This low level of reflectance between 200 and 400 nm can be attained by the addition of UV absorbing particles as described previously.

The process for adding the barium sulfate or the UV absorbing particles to the polyester matrix is not particularly restricted. The particles can be added in an extrusion process utilizing a twin-screw extruder.

Next, a process for producing a preferred embodiment of the film according to the present invention will be explained. However, the process is not particularly restricted to the following one.

Barium sulfate is mixed into poly(ethylene 1,4-cyclohexane dimethylene) in a twin screw extruder at a temperature of 260-280° C. This mixture is extruded through a strand die, cooled in a water bath, and pelletized. The pellets are then dried at 65° C. and fed into an extruder "A".

Polypropylene is blended as an incompatible polymer with polyethylene terephthalate. After sufficient blending and drying at 120° C., the mixture is supplied to an extruder "B" heated at a temperature of 270-290° C. The two kinds of polymers are co-extruded in a multi-manifold die or feed block in conjunction with a single manifold die to form a laminated structure of A/B or A/B/A.

The molten sheet delivered from the die is cooled and solidified on a drum having a temperature of 50-70° C. while applying either an electrostatic charge or a vacuum. The sheet is stretched in the longitudinal direction at a draw ratio of 2-5 times during passage through a heating chamber, and thereafter, the film is introduced into a tenter while the edges of the film are clamped by clips. In the tenter, the film is stretched in the transverse direction in a heated atmosphere having a temperature of 90-140° C. Although both the draw ratios in the longitudinal and transverse directions are in the range of 2 to 5 times, the area ratio between the non-stretched sheet and the biaxially stretched film is preferably in the range of 8 to 12 times. If the area ratio is less than 8 times, whitening of the film is insufficient. If the area ratio is greater than 12 times, a breakage of the film is liable to occur. Thereafter, the film is uniformly and gradually cooled to a room temperature, and wound.

The white polyester film thus obtained has a high reflectance of not less than 93% in the range of wavelength of a light of 400 to 700 nm. When the white polyester film is used as a reflector of a surface light source having a side light system, a high light efficiency can be obtained. Further, since the white polyester film according to the present invention has an excellent mean reflectance in the specified range of wavelength, the film can be utilized for various uses other than a reflector of a surface light source.

Next, the method for determining "mean reflectance" in the present invention will be explained.

Mean Reflectance:

A 60 mm integrating sphere is attached to a spectrophotometer (Perkin Elmer Lambda 800). A reflectance is determined in the ranges of wavelengths from 200 to 700 nm. The reflectance of Spectralon is defined as 100% and the measured reflectances are based on a comparison to the Spectralon. A value is obtained at an interval of 1 nm, and the average value over any defined wave length range is defined as the mean reflectance. The mean reflectance at wavelengths from 200 to 400.nm is considered here as UV light reflectivity. The mean reflectance at wavelengths from 400 to 700 nm is considered visible light reflectivity.

EXAMPLES

Preferred examples will be hereinafter explained together with some comparative examples of commercial reflector films used for side light assemblies. The resulted data are shown in Table 1.

Example 1

A 3-layer film (with designated layers 1, 2 and 3) comprising voided polyester matrix layers was prepared in the following manner. Materials used in the preparation of layers 1 and 3 of the film were formulated by first compound blend ing 60% by weight of barium sulfate ($BaSO_4$) particles approximately 0.7 μm in diameter (Blanc Fixe XR-HN available from Sachtleben Corp.) and 40% by weight PETG 6763 resin (IV=0.73 dl/g) (an amorphous polyester resin available from Eastman Chemical Company). The $BaSO_4$ inorganic particles were compounded with the PETG polyester by mixing in a counter-rotating twin-screw extruder attached to a strand die. Strands of extrudate were transported through a water bath, solidified, and fed through a pelletizer, thereby forming pellets of the resin mixture. The pellets were then dried in a desiccant dryer at 65° C. for 12 hours.

As the material for layer 2, poly(ethylene terephthalate) (#7352 from Eastman Chemicals Company) was dry blended with polypropylene("PP", Huntsman P4G2Z-073AX) at 20% weight and dried in a desiccant dryer at 65° C. for 12 hours.

Cast sheets of the noted materials were co-extruded to produce a combined support having the following layer arrangement: layer 1/layer 2/layer 3, using a 2.5 inch (6.35 cm) extruder to extrude layer 2, and a 1 inch (2.54 cm) extruder to extrude layers 1 and 3. The 275° C. melt streams were fed into a 7 inch (17.8 cm) multi-manifold die also heated at 275° C. As the extruded sheet emerged from the die, it was cast onto a quenching roll set at 55° C. The PP in layer 2 dispersed into globules between 10 and 30 μm in size during extrusion. The final dimensions of the continuous cast multilayer sheet were 18 cm wide and 860 μm thick. Layers 1 and 3 were each 215 μm thick while layer 2 was 430 μm thick. The cast multilayer sheet was then stretched at 110° C. first 3.0 times in the X-direction and then 3.4 times in the Y-direction. The stretched sheet was then heat set at 150° C. and its final thickness was 144 μm.

Example 2

A 3-layer film (with designated layers 1, 2 and 3) comprising voided polyester matrix layers was prepared in the following manner. Materials used in the preparation of layers 1 and 3 of the film were formulated by first compound blend ing 60% by weight of barium sulfate ($BaSO_4$) particles approximately 0.7 μm in diameter (Blanc Fixe XR-HN available from Sachtleben Corp.) and 40% by weight PETG 6763 resin (IV=0.73 dl/g) (an amorphous polyester resin available from Eastman Chemical Company). The $BaSO_4$ inorganic particles were compounded with the PETG polyester by mixing in a counter-rotating twin-screw extruder attached to a strand die. Strands of extrudate were transported through a water bath, solidified, and fed through a pelletizer, thereby forming pellets of the resin mixture. A titanium dioxide in polyester concentrate (9663E0002 from Eastman Chemical, a 50/50 concentrate of titanium dioxide and polyester) was then added to the compounded pellets at a 4% by weight. This resulted in a 2% titanium dioxide concentration in the blend. The blend was then dried in a desiccant dryer at 65° C. for 12 hours.

As the material for layer 2, poly(ethylene terephthalate) (#7352 from Eastman Chemicals Company) was dry blended with polypropylene("PP", Huntsman P4G2Z-073AX) at 20% weight and dried in a desiccant dryer at 65° C. for 12 hours.

Cast sheets of the noted materials were co-extruded to produce a combined support having the following layer arrangement: layer 1/layer 2/layer 3, using a 2.5 inch (6.35 cm) extruder to extrude layer 2, and a 1 inch (2.54 cm) extruder to extrude layers 1 and 3. The 275° C. melt streams were fed into a 7 inch (17.8 cm) multi-manifold die also heated at 275° C. As the extruded sheet emerged from the die, it was cast onto a quenching roll set at 55° C. The PP in layer 2 dispersed into globules between 10 and 30 μm in size during extrusion. The final dimensions of the continuous cast multilayer sheet were 18 cm wide and 816 μm thick. Layers 1 and 3 were each 204 μm thick while layer 2 was 408 μm thick. The cast multilayer sheet was then stretched at 110° C. first 3.0 times in the X-direction and then 3.4 times in the Y-direction. The stretched sheet was then heat set at 150° C. and its final thickness was 127 μm.

Example 3

A 3-layer film (with designated layers 1, 2 and 3) comprising voided polyester matrix layers was prepared in the following manner. Materials used in the preparation of layers 1 and 3 of the film were formulated by first compound blend ing 65% by weight of barium sulfate ($BaSO_4$) particles approximately 0.7 μm in diameter (Blanc Fixe XR-HN available from Sachtleben Corp.) and 35% by weight PETG 6763 resin (IV=0.73 dl/g) (an amorphous polyester resin available from Eastman Chemical Company). The $BaSO_4$ inorganic particles were compounded with the PETG polyester by mixing in a counter-rotating twin-screw extruder attached to a strand die. Strands of extrudate were transported through a water bath, solidified, and fed through a pelletizer, thereby forming pellets of the resin mixture. A titanium dioxide in polyester concentrate (9663E0002 from Eastman Chemical, a 50/50 concentrate of titanium dioxide and polyester) was then added to the compounded pellets at a 14% by weight. This resulted in a 7% titanium dioxide concentration in the blend. The blend was then dried in a desiccant dryer at 65° C. for 12 hours.

As the material for layer 2, poly(ethylene terephthalate) (#7352 from Eastman Chemicals Company) was dry blended with polypropylene("PP", Huntsman P4G2Z-073AX) at 20% weight and dried in a desiccant dryer at 65° C. for 12 hours.

Cast sheets of the noted materials were co-extruded to produce a combined support having the following layer arrangement: layer 1/layer 2/layer 3, using a 2.5 inch (6.35 cm) extruder to extrude layer 2, and a 1 inch (2.54 cm) extruder to extrude layers 1 and 3. The 275° C. melt streams were fed into a 7 inch (17.8 cm) multi-manifold die also heated at 275° C. As the extruded sheet emerged from the die, it was cast onto a quenching roll set at 55° C. The PP in layer 2 dispersed into globules between 10 and 30 μm in size during extrusion. The final dimensions of the continuous cast multilayer sheet were 18 cm wide and 860 μm thick. Layers 1 and 3 were each 215 μm thick while layer 2 was 430 μm thick. The cast multilayer sheet was then stretched at 110° C. first 3.0 times in the X-direction and then 3.4 times in the Y-direction. The stretched sheet was then heat set at 150° C. and its final thickness was 144 μm.

The comparative samples below are all commercial reflector films designed for side light assemblies for LCD's. The Manufacturer and product code names are given. These samples represent what are considered the state of the art in commercial reflector films.

| | |
|---|---|
| Comparative 1 | Keiwa, BR-1 |
| Comparative 2 | Kimoto, RW 125 |
| Comparative 3 | Kimoto, RW 75CB |
| Comparative 4 | Kimoto, RW X3T |
| Comparative 5 | Kimoto, RW 188 |
| Comparative 6 | Tsujiden, RF-75 |
| Comparative 7 | Tsujiden, RF-188 |
| Comparative 8 | Tsujiden, RF-195E |
| Comparative 9 | Tsujiden, RF-215G |
| Comparative 10 | Tsujiden, RF-220EG |
| Comparative 11 | Tsujiden, MTN-W400 |

The comparative samples along with the examples of the present invention are listed in Table 1. A description by manufacturer and code number are given for the comparative samples and a description by Layer 1 and 3 material content are given for the examples of the present invention. The thickness of each sample was measured and is listed. Reflectance measurements were made on all the samples as well. The mean reflectance at wavelengths from 400 to 700 nm is given as the visible reflectance for each sample. The mean reflectance from 200 to 400 nm is given as the UV reflectance for each sample.

TABLE 1

| SAMPLE | DESCRIPTION | THICKNESS (μm) | VISIBLE REFLECTANCE (400-700 nm) (%) | UV REFLECTANCE (200-400 nm) (%) |
|---|---|---|---|---|
| Comparative 1 | Keiwa BR-1 | 206 | 95.7 | 50.7 |
| Comparative 2 | Kimoto RW 125 | 122 | 92.2 | 49.4 |
| Comparative 3 | Kimoto RW 75CB | 107 | 92.4 | 41.8 |
| Comparative 4 | Kimoto RW X3T | 137 | 92.5 | 9.4 |
| Comparative 5 | Kimoto RW 188 | 188 | 94.9 | 51.5 |
| Comparative 6 | Tsujiden RF-75 | 81 | 85.3 | 47.7 |
| Comparative 7 | Tsujiden RF-188 | 183 | 94.2 | 50.3 |
| Comparative 8 | Tsujiden RF-195E | 188 | 94.6 | 47.0 |
| Comparative 9 | Tsujiden RF-215G | 216 | 95 | 50.0 |
| Comparative 10 | Tsujiden RF-220EG | 218 | 94.9 | 47.1 |
| Comparative 11 | Tsujiden MTN-W400 | 249 | 94.9 | 50.3 |
| Example 1 | PETG/BaSO4 (No TiO2) | 143 | 94.8 | 48.4 |

TABLE 1-continued

| SAMPLE | DESCRIPTION | THICKNESS (μm) | VISIBLE REFLECTANCE (400-700 nm) (%) | UV REFLECTANCE (200-400 nm) (%) |
|---|---|---|---|---|
| Example 2 | PETG/BaSO4 w/2% TiO2 | 127 | 95.1 | 29.9 |
| Example 3 | PETG/BaSO4 w/7% TiO2 | 144 | 95.7 | 25.2 |

It can be seen that none of the comparative samples have a visible reflectance of at least 93% when their thickness is less than 150 μm. All of the examples of the present invention are less than 150 μM thick but have reflectance of at least 93%. Also, only one comparative sample has UV reflectance less than 40% (comparative 4) but its visible reflectance is less than 93%. Examples 2 and 3 of the present invention both have UV reflectance significantly below 40% while maintaining visible reflectance of at least 93%.

Typical films made as described in the inventive examples were cross-sectioned and photomicrographed such that the void volume percentages could be determined. Typical void volume percentages of the inventive films made in the examples were 61% to 65%.

The invention has been described in detail with particular reference to certain preferred embodiments thereof, but it will be understood that variations and modifications can be affected within the scope of the invention. The entire contents of the patents and other publications referred to in this specification are incorporated herein by reference.

The invention claimed is:

1. An LCD display comprising, as a back light reflector, a reflective optical film comprising a first layer containing a polyester voided with barium sulfate particles in a size and an amount sufficient to provide a visible light reflectivity for the film of at least 93%, the film at least (1) having a thickness of less than 150 μm, or (2) containing UV particles in amounts sufficient to provide a UV light reflectivity of less than 40%;
wherein a second voided polyester layer is adjacent to and integral with said polyester voided layer with barium sulfate particles; and
wherein a third voided polyester layer with barium sulfate is adjacent and integral to said second voided polyester layer and on the opposite side of said second layer from the first voided polyester layer with barium sulfate.

2. The display of claim 1 having a film thickness of less than 150 μm.

3. The display of claim 2, the film further comprising dispersed UV absorbing particle; the barium sulfate and UV particles being present in amounts sufficient to provide a visible light reflectivity of at least 93% and a UV light reflectivity of less than 40%.

4. The display of claim 3 wherein the barium sulfate particles in the first layer are present in an amount between 40 to 70 wt of the layer and the UV absorbing particles are present in an amount between 0.5 to 10.0 wt % of the layer.

5. The display of claim 4 wherein said dispersed UV absorbing particles include titanium dioxide.

6. The display of claim 2 wherein said barium sulfate particles in the first layer have an average size from 0.1 to 10.0 μm.

7. The display of claim 6 wherein said barium sulfate particles have an average size from 0.3 to 2.0 μm.

8. The display of claim 1 wherein said polyester in the first layer is poly(ethylene-1,4-cyclohexanedimethylene terephthalate).

9. The display of claim 1 wherein the barium sulfate particles in the first layer are present in an amount between 40 to 70 wt % of the layer.

10. The display of claim 1 wherein the second voided-polyester layer comprises a polymer that is immiscible with polyester as voiding agent.

11. The display of claim 10 wherein the polymer that is immiscible with polyester is polypropylene.

12. The display of claim 10 wherein the polymer that is immiscible with polyester is present in the layer at 5 to 30 wt % of the second layer.

13. The display of claim 1 wherein the second voided polyester layer comprises polyethylene(terephthalate).

14. The display of claim 1 containing dispersed UV absorbing particles, said particles being present in an amount sufficient to provide a UV light reflectivity of less than 40%.

15. The display of claim 14 having a thickness of greater than 150 μm.

16. The display of claim 14 wherein said polyester in the first layer is poly(ethylene-1,4-cyclohexanedimethylene terephthalate).

17. The display film of claim 14 comprising a polyester voided first layer with barium sulfate particles present in an amount between 40 end 70 wt % and containing dispersed UV absorbing particles present in an amount between 0.5 to 10.0 wt %.

18. The display of claim 14 wherein said dispersed UV absorbing particles include titanium dioxide.

19. The display film of claim 14 wherein said first layer barium sulfate particles have an average size from 0.1 to 10.0 μm.

20. The display of claim 19 wherein said barium sulfate particles have an average size from 0.3 to 2.0 μm.

21. Tho display film of claim 1 wherein the barium sulfate particles in the first layer are present in a size and an amount sufficient to provide a visible light reflectivity of at least 95%.

* * * * *